United States Patent [19]

Ganter

[11] Patent Number: 5,077,706

[45] Date of Patent: Dec. 31, 1991

[54] AUTONOMOUS RADIO TIMEPIECE CAPABLE OF AUTOMATIC CORRECTION REGARDLESS OF TIME ZONE CHANGES

[75] Inventor: Wolfgang Ganter, Schramberg, Fed. Rep. of Germany

[73] Assignee: Junghans Uhren GmbH, Schramberg, Fed. Rep. of Germany

[21] Appl. No.: 446,474

[22] Filed: Dec. 5, 1989

[30] Foreign Application Priority Data

Dec. 8, 1988 [DE] Fed. Rep. of Germany ... 8815281[U]

[51] Int. Cl.[5] .......... G04C 11/02; H04B 1/16

[52] U.S. Cl. .......... 368/47; 455/231

[58] Field of Search .......... 368/46, 47, 52, 10, 368/185–187

[56] References Cited

U.S. PATENT DOCUMENTS

| | | | |
|---|---|---|---|
| 3,541,552 | 11/1970 | Carlson | 368/47 |
| 4,023,344 | 5/1977 | Mukaiyama | 368/47 |
| 4,117,661 | 10/1978 | Bryant, Jr. | 368/47 |
| 4,201,041 | 5/1980 | Tanaka | 368/187 |
| 4,204,167 | 5/1980 | Liu | 455/231 |
| 4,204,398 | 5/1980 | Lemelson | 368/47 |
| 4,234,958 | 11/1980 | Pipes et al. | 375/107 |
| 4,396,293 | 8/1983 | Mizoguchi | 368/15 |
| 4,543,657 | 9/1985 | Wilkinson | 368/47 |
| 4,582,434 | 4/1982 | Plangger et al. | 368/46 |

*Primary Examiner*—Vit W. Miska

*Attorney, Agent, or Firm*—Burns, Doane, Swecker & Mathis

[57] ABSTRACT

An autonomous radio timepiece is provided which will furnish a usable time display even when it is outside the time zone of the sender or if the timepiece is to be actuated, when it is not possible at a given point in time to receive valid time telegrams. For this, the timepiece is equipped with a manually actuated hour switch for the input of correction information in a supplemental memory, the content of which is summed together for the actual hour display with that of the hour register, possible set by radio. By actuating a START switch to a full hour, for example, synchronized with the reception of an hour synchronizing signal from another source, the content of the register is brought into a full hour position and from there, stepped forward by an internal time keeping step circuit. The receiver is actuated simultaneously in order to correct the content of the register if a valid time telegram is received. Should this not take place within a reasonable period of time, the hour setting, which possibly is displayed incorrectly, may be corrected manually by means of the hour switch, by setting its memory to the display difference required.

18 Claims, 1 Drawing Sheet

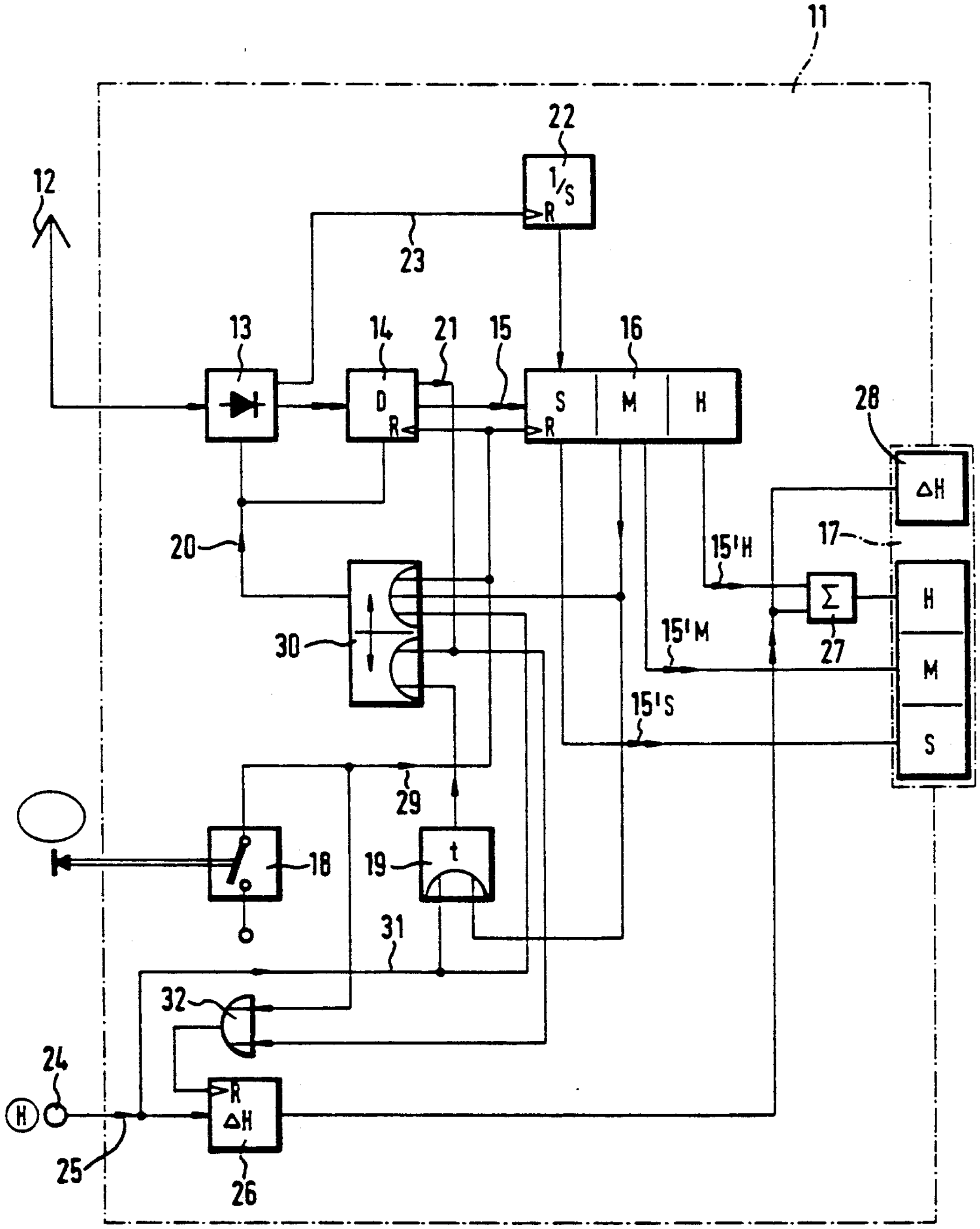
11
22
1/S
R
12
23
13
14
21
15
16
D
R
S
M
H
R
28
ΔH
20
17
15'H
Σ
H
30
27
15'M
M
15'S
S
29
18
19
t
31
32
24
H
R
ΔH
25
26

AUTONOMOUS RADIO TIMEPIECE CAPABLE OF AUTOMATIC CORRECTION REGARDLESS OF TIME ZONE CHANGES

BACKGROUND OF THE INVENTION

This application is related to a copending application entitled "Autonomous Radio Timepiece Having a Resettable Receiver Actuation Switch" in the name of the present inventor, filed on or about the date of filing of the present application.

1. Field of the Invention

The present invention concerns an autonomous radio timepiece having a time display which may be set to a predetermined initial position by means of a START switch actuating a receiver.

2. The Related Art

A radio timepiece of this type is known from the article by W. Ganter "JUNGHANS Radio Timepiece RC2" in Goldschmiede-Zeitung No. Jan., 1988, page 148. This radio timepiece which within a short period of time attained market leadership, activates the receiver periodically temporarily, at predetermined points in time, in order to correct the instantaneous time display, if necessary, to reflect the time received in a radio transmitted time telegram. Independently, the receiver may be turned on by actuating a reset or START switch, whereby the instantaneous time display is simultaneously set to the 00:00:00 H reference position. As soon as valid time information is received by radio, the receiver is deactivated and the time display is rapidly set to the corresponding position. If it is necessary to move mechanical parts (hands or digital drop disks) in the process, the time required for this operation is taken into consideration in the setting, so that the actual instantaneous time is correctly displayed.

However, a problem may be caused by the fact that the time information transmitted by the radio station relates to a certain geographic time zone. In the case of a portable time piece, for example, a wristwatch or an alarm clock, the display on the timepiece will no longer be correct relative to the hour, if the traveller passes the boundary of a time zone. In these cases, because of the new time zone. the indication of the hour may be earlier or later by at least one hour (or depending on the state of the time zone, by one-half hour).

There arises an even more severe problem if a radio timepiece of this particular generic type is to be actuated, but due to local conditions at the given location no correct time telegrams can be received. This may occur, for example, due to poor receiving conditions, or the operating state of the sender, for example, a station which is deactivated instantaneously or possibly until further notice. However, users can expect that a high technology product, such as a user radio timepiece, would be usable as a timepiece even under such exceptional conditions specific to radio.

SUMMARY OF THE INVENTION

In view of these conditions, it is the object of the present invention to overcome the aforementioned disadvantages.

It is a further object of the present invention to equip a radio timepiece of a generic type so that it may be operated even after a change of time zones, without receiving time telegrams set for the new time zone, with the correct display of time.

It is a further object of the present invention to operate a radio timepiece as a timepiece of conventional accuracy even if, at any given moment, no evaluable time telegrams may be received.

These objects are attained essentially by a radio timepiece that is equipped with an hour switch for allowing the modification of the hour display.

The solution according to the present invention is thus based on the discovery that it is sufficient, in the case of a correctly indicating radio timepiece, to correct the existing hourly indication one time manually (that is, set it ahead or back) after a change in the time zone, whereupon, in the future, this time zone correction will be automatically taken into consideration in the radio controlled time display. For this, the time zone correction value may be entered manually into a separate hour memory, from which the correction value (with reference to the accompanying addition or subtraction sign) is combined with the decoded hour information actually received from the sender, which is set for another time zone, for the display of the actual local time. In this manner, radio controlled operation is possible even outside the time zone for which the sender is set. If the traveller returns to the time zone for which the sender is correct, the previous zone correction may be cancelled either by setting the additional zone hour memory manually to zero, so that no zone correction is added to the hour information received by radio, or by restarting the radio timepiece by actuating the reset key, whereby the hour correction memory is simultaneously set to zero.

The present invention makes it possible further to await, in order to activate the timepiece without the instantaneous receipt of valid time telegrams in a conventional manner, the synchronizing signal sent out, for example, by radio stations at full hours, and then to actuate the reset or START switch. The time display is thereby reset to 00 minutes and 00 seconds and the timepiece started under an internal time basis for the continued display of time, but with an arbitrary incorrect (randomly entered) indication of the hour, or the hour 00, if the hour display has also been sent to 00 by the reset switch. The hour display is corrected together with the actualization of the rest of the instantaneous time display, if a valid radio time telegram is received. If this does not occur within a reasonable period of time, then, as in the case of a change in time zones, a manual correction of the obviously incorrect hour display is carried out by setting the additional hour memory. Based on this correction information, the hour display is then continued by the internal time basis. If subsequent thereto, occasions should arise in which time telegrams may be received and decoded, the hour memory associated with the receiver (in the display register) is set to the sender hour and the hour memory associated with the hour switch must be corrected correspondingly, so that the hour displayed again corresponds with the local geographic conditions.

Similarly to situation of the adjustment of the instantaneous time display to the actual prevailing time, it is also true for the zero setting of the time display by actuating the reset or START switch that the adjustment of the display may be carried out practically without inertia, if the time display is nonmechanical, i.e., for example an electronic display for the display of stepping hand or digital symbols. However, the solution according to the present invention may also be applied to mechanically stepping time displays (e.g., gear driven hands or other mechanical displays, such as digital drop disks). In these cases, it is merely necessary to take into consideration, by means of an appropriate correction, in a manner known in itself, the time delay involved for the movement from the instantaneously given display position into the 00 reference position, when, upon the appearance of the hour synchronizing mark, the START switch was activated. The time keeping stepping movement of the display then takes place from the internal time basis, as soon as the instantaneous display has reached the actual prevailing time.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

Additional alternatives and further developments and advantages of the invention will become apparent from the description of a preferred example of embodiment of the invention shown in the drawing, in which:

the single drawing figure shows a highly simplified single pole block circuit diagram of an autonomous radio timepiece with a digital time display and manually actuated synchronizing and time zone switches.

DETAILED DESCRIPTION OF THE PREFERRED EMBODIMENT

The autonomous radio timepiece 11 schematically shown in the form of a circuit diagram comprises a receiver 13 tuned to a time sender frequency and connected with an antenna 12, together with a decoder 14 for decoding the prevailing time information contained in the demodulated receiver information 15. The demodulated time information 15 is converted in a register 16 for the segment actuation of a display 17 with hour (H), minute (M) and section (S) displays as the time information 15' to be represented. To save energy, i.e., in particular in the interest of providing long operating times for a battery (not shown) of the portable radio timepiece 11, the receiver 13 and the associated decoder 14 are not continuously operated. Rather, their operation is activated by the actuation of a reset or START switch 18 by means of a switch-on signal, or when the time decoder 14 has detected a predetermined point in time. This time period may be, for example, upon reaching a full hour. The period of time may be determined by means of a time element 19. Alternatively, this may be visualized in the drawing by an additional query of the minute field 16M.

The START switch 18 simultaneously carries out a register reset and subsequently clocking of the display region 16 from an internal time keeping switch 22. The output of time information 15 obtained, for example, from a comparison of two successive time telegrams, causes, by means of reversing signal 21 (shown in a functionally simplified manner only) and a flip-flop circuit 30, the deactivation of the receiver and possibly the decoder 14. Further, the time information 15 which is corrected in accordance with the time telegram, is now continued to be counted from the internal stepping circuit 22. The stepping circuit 22 may advantageously consist of a quartz stabilized oscillator, which may be synchronized by the receiver 13 by way of a second cycle conductor 23, with the modulation cycle of the time telegrams transmitted by radio.

The hour jog to be carried out in the summer-winter time change is taken into consideration on the modulation side in the time telegram transmitted by radio, and therefore, leads in the next time controlled generation of the actuation signal 20, to its inclusion in the activation of the register 16 and to the correction of the time display H. If, however, the radio timepiece 11 is taken along when travelling, wherein a time zone boundary is passed, the necessary hour correction information cannot be contained in the time telegram received from a time sender set for the original time zone, independently of whether the sender can even be received from the distance of the next time zone. For example, the fact of a change in time zones is, for example, communicated to airline passengers. It is now possible to correct the hour display H belong to the previous time zone, with the unchanged activation of the minute and second displays M, S, by means of a manually actuated hour switch 24. This yields, for example, by the repeated actuation of a key or rotation of a rotary type switch, a series of hour correction pulses 25 or the direct entry of a numerical correction value ΔH into an hour memory 26 provided additionally to the hour register 16H. The hour memory 26, similarly to the resetting described earlier of the region 16, is reset by the actuation of the START switch 18 through its reset inlet, to the initial zero position. For arriving at the indication displayed on the display 17, the instantaneous register hour signal 15'H is combined in a summer 27 with the correction information ΔH in the hour memory 26 to take into consideration the positive or negative deviation from the prevailing time zone hour from the sender related register hour 15'H in the hour display 17H. In a supplemental display 28, in or next to the time display 17, the instantaneous correction input into the time zone hour memory 26 may be presented, in order to provide rapid information relative to by how many hours, forward or backward counting half or whole, the prevailing time zone related hour display 17H deviates from the time zone hour 15H of the sender location. Upon returning into the sender time zone, it is merely necessary for the traveller to delete the correction memory 26, by setting memory 26 to zero with the handle of the hour hand 24 or by repeated actuation of the START switch 18, so that after the resetting operation is complete, no time zone correction will be added to or subtracted from the hour display 17H. Thus, the sender related register hour signal 15'H will appear as the instantaneously prevailing hour display 17H.

In an area in which no time sender is received or for which no time sender is being operated, the radio timepiece 11 may be operated as a timepiece run autonomously from its stepping circuit 22 in a time correct manner by actuating the START switch 18, exactly at the appearance of a time signal emitted, for example, by public radio at certain full hours (which therefore represents only a time synchronizing mark and not a coded complete time information). The start signal 29 triggered thereby resets the flip-flop circuit 30, in order to trigger the actuating signal 20 to begin another attempt at receiving. In addition, the register 16 for the time indication display 17 is set to 00:00:00 and is operated from this full hour display by the stepping circuit 22 in a time keeping manner. Then, within the limits of the accuracy of actuating the start switch 18 upon the appearance of the synchronizing signal, the continuous minute display M and second display S are in agreement with the actual progress of time, but not the prevailing hour display H, unless a midnight synchronizing signal is used. It may then be seen, for example with reference to the time of day, from the obvious erroneous hour display 17H, that the timepiece 11 operates only on the time keeping base of the interval stepping circuit 22 and that the valid hour H must be set manually by means of the hour switch 24. In order to render this fact more apparent, the hour display H may be, for example, corrected intermittently, until the hour switch 24 is actuated for entering of the hour correction or until a decodable time signal is obtained by means of the receiver 13.

For the rest of the time, by means of the actuation of the hour switch 24, represented in the simplified circuit by a control line 21 to the flip-flop circuit 30 and the time element 19, the receiver is always reversed in periodic operation, and queried, for example, from the minute register 16M, for renewed activation, so that there an immediate correction of the time indication in the display 17 when the bearer of the timepiece 11 reenters an area in which the time telegram emitter coordinated with the receiving frequency can again be received. In this manner, the slight potential error that had to be accepted when, in the absence of the possibility of receiving time telegrams, the timepiece 11 was started with reference to a neutral hour indication, a correction of the hour display 17H was based on information from outer sources concerning the correct hour of the day is avoided. When a radio time signal 15 is then detected for the first time, advantageously the information in the separate hour memory 26, which is no longer needed, is deleted, so that no incorrect hour H will be displayed by means of the summer 27, even if the user of the timepiece 11 forgets to reset the memory 26 with the switch 24. In the example of the embodiment described herein, the reset inlet R of the memory 26 is actuated by means of an OR gate 32, if, as mentioned above, a new reception start is introduced through the switch 18, or if a receiver reversing signal 21 appears. If the wearer of the timepiece is in a different time zone, the display may again be modified by means of the hour memory 26, as described above.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. An autonomous radio controlled timepiece having a time display having an hour display, the timepiece comprising:
- a receiver for receiving radio time telegrams;
- a start switch for actuating the receiver and setting the time display to a predetermined initial position;
- an hour switch for modifying the hour display; and
- means for initializing an actuation of the receiver responsive to actuation of the hour switch.

2. The radio controlled timepiece according to claim 1, further comprising:
- memory means for storing an hour correction value input by said hour switch; and
- means for correcting the hour display responsive to the hour switch and comprising a summer for summing a register hour signal received from the receiver and the hour correction value received from the memory means.

3. The radio controlled timepiece according to claim 1, further comprising an internal stepping circuit, wherein the START switch initiates, upon activation, a time keeping stepping movement of the time display substantially simultaneously from the internal stepping circuit.

4. The radio controlled timepiece according to claim 3, further comprising means for synchronizing the internal stepping circuit of the receiver with a second cycle of the time telegrams.

5. The radio controlled timepiece according to claim 1, further comprising an additional display for displaying a manually entered correction value of the hour display.

6. The radio controlled timepiece according to claim 1, further comprising an electrooptical display comprising a minute display and a second display which may be switched practically without delay.

7. The radio controlled timepiece according to claim 1, wherein the timepiece is in the form of a wristwatch.

8. The radio controlled timepiece according to claim 2, further comprising a register for storing received valid time telegrams, wherein the START switch is actuable to reset the register and the hour correction value.

9. The radio controlled timepiece according to claim 1, wherein means for initializing initializes a temporary actuation of the receiver responsive to actuation of the hour switch.

10. An autonomous timepiece comprising:
- a receiver for receiving radio time telegrams;
- a time display comprising an hour display;
- a first switch for actuating said receiver and setting said time display to a predetermined initial position; and
- a second switch for modifying, independently of the radio time telegrams, said hour display; and means for initializing an actuation of the receiver responsive to actuation of the hour switch.

11. The timepiece according to claim 11, further comprising:
- memory means for storing an hour correction value; and
- means for correcting the hour display responsive to said second switch and comprising a summer for summing a register hour signal received from the receiver and said hour correction value received from said memory means.

12. The radio controlled timepiece according to claim 11, further comprising an internal stepping circuit for autonomously keeping correct time of said timepiece, wherein said first switch initiates, upon activation, a time keeping stepping movement of said time display by said internal stepping circuit.

13. The radio controlled timepiece according to claim 13, further comprising means for synchronizing said internal stepping circuit of the receiver with a second cycle of said time telegrams.

14. The radio controlled timepiece according to 11, further comprising an additional display for displaying a manually entered correction value of said hour display.

15. The radio controlled timepiece according to claim 11, further comprising an electrooptical display comprising a minute display and a second display.

16. The radio controlled timepiece according to claim 12, further comprising a register for storing received valid time telegrams, wherein said first switch is actuable to reset the register and said hour correction value.

17. An autonomous controlled radio timepiece having a time display having an hour display, the timepiece comprising:

a receiver for receiving radio time telegrams;

a start switch for actuating the receiver to receive the time telegrams and for setting the time display to a predetermined initial position;

an hour switch for inputting an hour correction value for modifying the hour display, said hour switch being actuable to correct the hour display when a valid time telegram is not received; and means for initializing an actuation of the receiver responsive to actuation of the hour switch.

18. The radio controlled timepiece according to claim 17, further comprising:

register means for receiving an hour value from the time telegrams received by said receiver;

memory means for storing the hour correction value input by said hour switch; and means for correcting the hour display comprising a summer for summing the hour value received by said register means and the hour correction value received from the memory means.

* * * * *